United States Patent
Franz et al.

(10) Patent No.: US 10,083,510 B2
(45) Date of Patent: Sep. 25, 2018

(54) UNSUPERVISED TRAINING FOR AN ATLAS-BASED REGISTRATION

(71) Applicant: KONINKLIJKE PHILIPS N.V., Eindhoven (NL)

(72) Inventors: Astrid Ruth Franz, Hamburg (DE); Nicole Schadewaldt, Norderstedt (DE); Heinrich Schulz, Hamburg (DE); Daniel Bystrov, Hamburg (DE); Torbjoern Vik, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 96 days.

(21) Appl. No.: 15/116,687

(22) PCT Filed: Feb. 17, 2015

(86) PCT No.: PCT/IB2015/051154
§ 371 (c)(1),
(2) Date: Aug. 4, 2016

(87) PCT Pub. No.: WO2015/128775
PCT Pub. Date: Sep. 3, 2015

(65) Prior Publication Data
US 2016/0358336 A1 Dec. 8, 2016

Related U.S. Application Data

(60) Provisional application No. 61/945,292, filed on Feb. 27, 2014.

(51) Int. Cl.
*G06K 9/00* (2006.01)
*G06T 7/00* (2017.01)
(Continued)

(52) U.S. Cl.
CPC .......... *G06T 7/0034* (2013.01); *G06K 9/6255* (2013.01); *G06T 7/32* (2017.01);
(Continued)

(58) Field of Classification Search
None
See application file for complete search history.

(56) References Cited

U.S. PATENT DOCUMENTS 8,411,950 B2    4/2013   Akinyemi et al.
8,600,131 B2 *  12/2013  Miller .................. A61B 6/501
                                                       128/922
(Continued)

OTHER PUBLICATIONS

Park, H., "Adaptive Registration and Atlas Based Segmentation", Dissertation submitted to University of Michigan, 2003.
(Continued)

*Primary Examiner* — Soo Park (57) ABSTRACT

A method includes obtaining a single training image from a set of training images in a data repository. The method further includes generating an initial tissue class atlas based on the obtained single training image. The initial tissue class atlas includes two or more different tissue class images corresponding to two or more different tissue classes. The method further includes registering the remaining training images of the set of training images to the initial tissue class atlas. The method further includes generating a quality metric for each of the registered images. The method further includes evaluating the quality metric of each of the registered image with a predetermined evaluation criterion. The method further includes identifying a sub-set of images from the set of training images that satisfy the evaluation criterion. The method further includes generating a subsequent tissue class atlas based on the identified sub-set of the set of training images.

18 Claims, 4 Drawing Sheets

(51) Int. Cl.
*G06K 9/62* (2006.01)
*G06T 7/32* (2017.01)
*G06T 7/35* (2017.01)
*G06K 9/20* (2006.01)

(52) U.S. Cl.
CPC ........ *G06T 7/35* (2017.01); *G06K 2009/2045* (2013.01); *G06K 2209/05* (2013.01); *G06T 2207/10081* (2013.01); *G06T 2207/20076* (2013.01); *G06T 2207/20081* (2013.01); *G06T 2207/30004* (2013.01)

(56) References Cited

U.S. PATENT DOCUMENTS

| | | | | |
|---|---|---|---|---|
| 8,958,615 | B2* | 2/2015 | Blum | G06T 7/0014 |
| | | | | 382/128 |
| 9,349,186 | B2* | 5/2016 | Liu | G06T 7/0081 |
| 9,373,173 | B2* | 6/2016 | Weistrand | G06T 7/0089 |
| 9,818,191 | B2* | 11/2017 | Magda | G06T 7/0014 |
| 9,818,200 | B2* | 11/2017 | Mohr | G06T 7/11 |
| 2003/0139659 | A1 | 7/2003 | Cale et al. | |
| 2007/0127790 | A1 | 6/2007 | Lau et al. | |
| 2013/0034203 | A1 | 2/2013 | Wang et al. | |
| 2014/0029812 | A1 | 1/2014 | Kriston et al. | |
| 2014/0161329 | A1* | 6/2014 | Tizhoosh | G06T 7/0081 |
| | | | | 382/128 |
| 2014/0341449 | A1* | 11/2014 | Tizhoosh | G06T 7/0083 |
| | | | | 382/128 |

OTHER PUBLICATIONS

Chui, H., et al., "Unsupervised Learning of an Atlas from Unlabeled Point-Sets", IEEE Transactions on Pattern Analysis and Machine Intelligence, vol. 26, No. 2, Feb. 2004.

Vik, T., et al., "A New Method for Robust Organ Positioning in CT Images", Biomedical Imaging (ISBI), 2012 IEEE International Sumposium, pp. 338-341.

Chen, V., et al., "Boostrap a statistical brain atlas", Proceedings Fifth IEEE Workshop on Applications of Computer Vision, 2000.

Gouthami, C., et al., "Statistical Atlases of Bone Anatomy: Construction, Iterative Improvement and Validation", Medical Image Computing and Computer-Assisted Intervention, 2007.

Criminisi, A., et al., "Regression Forests for Efficient Anatomy Detection and Localization in Computed Tomography Scans", Medical Image Analysis, Jan. 8, 2013.

Schadewaldt, N., et al., "Robust Initialization of Multi-Organ Shape Models", Philips Research Europe, 2013.

Seifert, S., et al., Hierarchical Parsing and Semantic Navigation of Full Body CT Data, Medical Imagining 2009, Image Processing, 725802-1 to 725902-8.

D-Agostino, E., et al., An Information Theoretic Approach for Non-Rigid Image registration using Voxel class Probabilities, Medical Image Analysis 10 (2006) 413-431.

* cited by examiner

UNSUPERVISED TRAINING FOR AN ATLAS-BASED REGISTRATION

CROSS-REFERENCE TO PRIOR APPLICATIONS

This application is the U.S. National Phase application under 35 U.S.C. § 371 of International Application Serial No. PCT/IB2015/051154, filed on Feb. 17, 2015, which claims the benefit of U.S. Application Ser. No. 61/945,292, filed on Feb. 27, 2014. These applications are hereby incorporated by reference herein.

The following generally relates to image processing and more particularly to training for an atlas based registration, and is described with particular application to computed tomography (CT). However, the following is also amenable to other imaging modalities.

The correlation of an unknown image to human anatomy often is the first task in many medical image processing applications, e.g. for automatic organ segmentation. To solve this problem, most approaches need a large amount of user input on some kind of ground truth. In the literature, a variety of approaches for anatomy detection and organ localization is used. While the detection of individual organs is highly specific and must be re-trained for new organs, a registration to an anatomical atlas can be used to detect the field-of-view and estimate the locations of several organs simultaneously.

Multi-atlas approaches are able to handle a variety of images via a database of reference images which are all registered to the unknown image independently. These approaches enable deformable registration and via label-fusion techniques segmentation of target structures. However, these approaches suffer from long computation times and a strong dependency on the selection of example images in the atlas. The generality of a single-instance average atlas has in recent approaches been improved by reducing gray values to tissue classes.

Another approach uses a class-label-based Mutual Information on a joint segmentation and registration. However, this approach needs integration over the whole image domain, which is inefficient. Another approach creates a tissue class atlas on pelvic and abdominal images. However, these atlases are specific to the anatomy and require given registrations of all training images into atlas space for training. Another approach trains regression forests for organ bounding box detection from tight organ bounding boxes, which have to be defined in the training data sets.

In general, the above and/or other known approaches require a large amount of ground truth information, e.g. ground truth organ segmentations, landmarks, a confirmed reference registration or at least consistent naming or DICOM tags. Further, many atlas training methods require the input images to be similar in some way, e.g. to have a similar field of view, similar protocol or contrast or show an overlapping anatomical region. Furthermore, atlas training procedures generally require a significant amount of training data selection and preparation.

Aspects described herein address the above-referenced problems and others.

The following describes a fully unsupervised approach (i.e., without an input of any registration, organ localization ground truth, etc.) to train an atlas-based registration based solely on a variable set of CT images. The fully unsupervised approach generally includes creating an initial tissue class atlas based on a single image out of a set of training images. The remaining training images are registered to the initial tissue class atlas. The registration of each image is evaluated, and images from registrations that satisfy predetermined criteria are identified. The identified images are used to create a next tissue class atlas, and the process of registering the training images, evaluating the registrations, and creating yet another tissue class atlas are repeated, for at least one iteration, stopping when no additional images satisfy the criteria. The final tissue class atlas can be utilized for the atlas-based registration and/or other applications requiring registration of images, for example, for organ detection, sematic navigation, etc. The atlas-based registration may also be used for big data analysis in the sense, that it may be used to identify data containing a specific anatomy or cut out a pre-defined region in the atlas space from a database of images, if this pre-defined region is contained. Further, the atlas-training procedure itself may be used to analyze a large dataset of images by inspecting a trained atlas with respect to variations and similarities in the image population.

In one aspect, a method includes obtaining a single training image from a set of training images in a data repository. The method further includes generating an initial tissue class atlas based on the obtained single training image. The initial tissue class atlas includes two or more different tissue class images corresponding to two or more different tissue classes. The method further includes registering the remaining training images of the set of training images to the initial tissue class atlas. The method further includes generating a quality metric for each of the registered images. The method further includes evaluating the quality metric of each of the registered image with a predetermined evaluation criterion. The method further includes identifying a sub-set of images from the set of training images that satisfy the predetermined evaluation criterion. The method further includes generating a subsequent tissue class atlas based on the identified sub-set of the set of training images.

In another aspect, a computing system includes a memory that stores instructions of an unsupervised training for an atlas-based registration module. The computing system further includes a processor that executes the instructions, which causes the processor to train an atlas-based registration based on the instructions of an unsupervised training for an atlas-based registration module.

In another aspect, a computer readable storage medium is encoded with computer readable instructions. The computer readable instructions, when executed by a processor, causes the processor to: train an atlas-based registration based on an unsupervised iterative training using a set of training images and predetermined stopping criteria, and generate a tissue class atlas based on the training.

The invention may take form in various components and arrangements of components, and in various steps and arrangements of steps. The drawings are only for purposes of illustrating the preferred embodiments and are not to be construed as limiting the invention.

Figure 1:
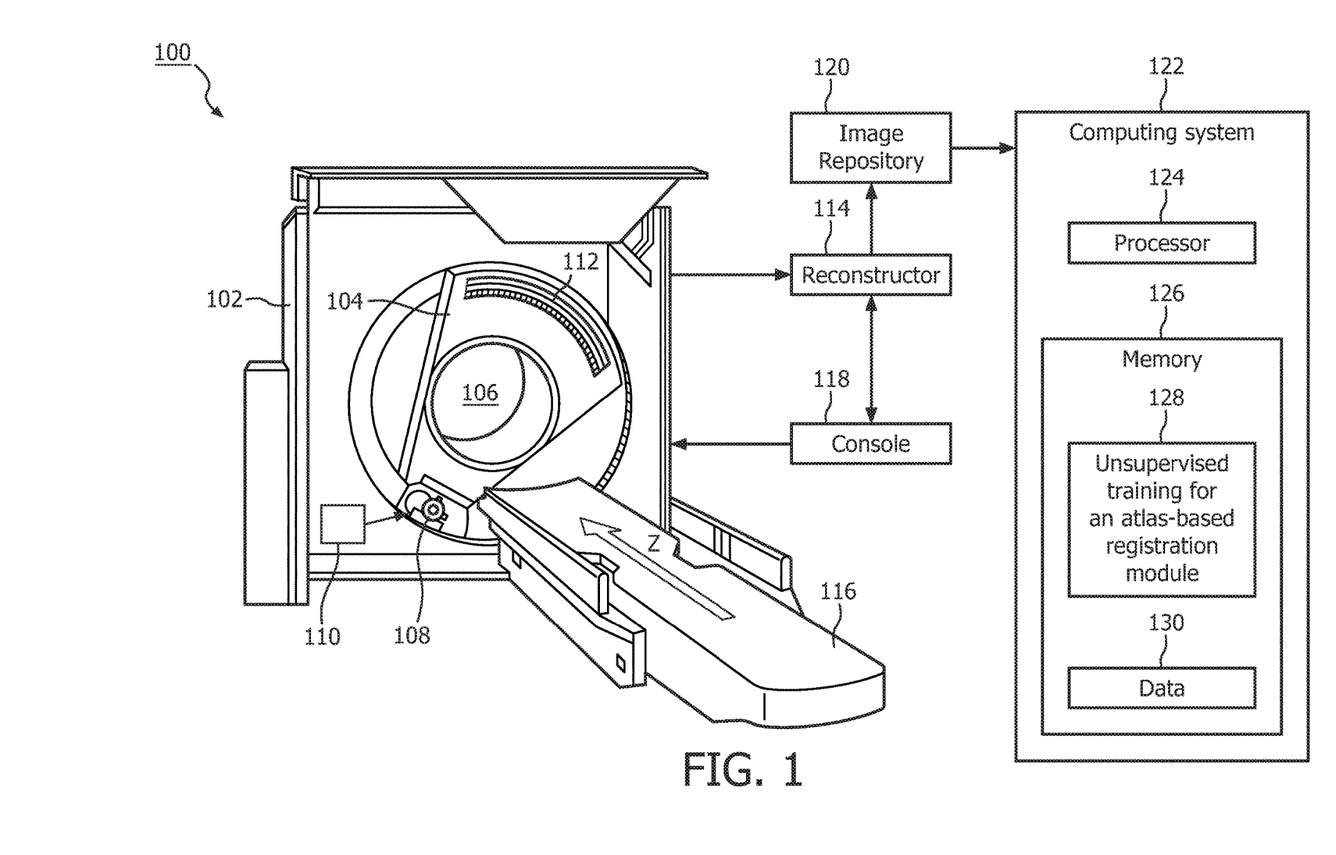
FIG. 1 schematically illustrates an example imaging system in connection with an image repository and a computing system with an unsupervised training for an atlas-based registration module.

Initially referring to FIG. 1, an imaging system 100 such as a computed tomography (CT) scanner is illustrated. The imaging system 100 includes a generally stationary gantry 102 and a rotating gantry 104, which is rotatably supported by the stationary gantry 102 and rotates around an examination region 106 about a z-axis.

A radiation source 108, such as an x-ray tube, is rotatably supported by the rotating gantry 104, rotates with the rotating gantry 104, and emits radiation that traverses the examination region 106. A detector array 112 subtends an angular arc opposite the examination region 106 relative to the radiation source 108. The detector array 112 detects radiation that traverses the examination region 106 and generates projection data indicative thereof.

A reconstructor 114 reconstructs the projection data, generating volumetric image data indicative the examination region 106. A subject support 116 supports a subject in the examination region 106. An operator console 118 includes a human readable output device such as a monitor and an input device such as a keyboard, mouse, etc. Software resident on the console 118 allows the operator to operate the system 100.

The resulting image data is archived in an image repository 120 such as a picture archiving and communication system or PACS, an electronic medical record or EMR, a radiology information system or RIS, a hospital information system or HIS, and/or other data repository, along image data from other patients and/or same and/or different modality imaging systems. The image repository 120 can store images generated by different imaging modalities, from different imaging facilities, acquired with different imaging protocols, for different patients, covering different anatomical regions of the body, etc.

A computing system 122 includes at least one processor 124 (e.g., a microprocessor, a central processing unit, etc.), computer readable storage medium ("memory") 126, which excludes transitory medium and includes physical memory and/or other non-transitory medium. The memory 126 stores one or more computer readable instructions such as an unsupervised training for an atlas-based registration module 128 and data 130. The instructions of the module 128, when executed by the processor 124, cause the processor 124 to perform unsupervised training for an atlas-based registration based on a set of training images. The data 130 includes default and/or other parameters utilized for the unsupervised training for atlas-based registration.

The unsupervised training can be used to build an anatomical atlas unsupervised and iteratively out of small image patches starting with any one of these patches. It requires only a pool of diverse medical images, for example, from the pelvis to head, with no alignment or annotations of any kind. However, every part of the target atlas anatomy must be covered, e.g. for a torso-atlas images from pelvis, abdomen, thorax and head with some overlap must be contained. The instructions of the module 128 use for instance cross-correlation as a quality measure to automatically determine successful registrations, which enables an unsupervised and iterative refinement of the atlas in an unsupervised learning process. For images with different fields-of-view and thus different anatomical content, the sampling is generalized to dynamic detection of the tissue classes of interest in unseen images. During training, the atlas domain extends itself to cover a sub-section of or the whole body. This approach is unsupervised in that it needs no input except the set of images.

Figure 2:
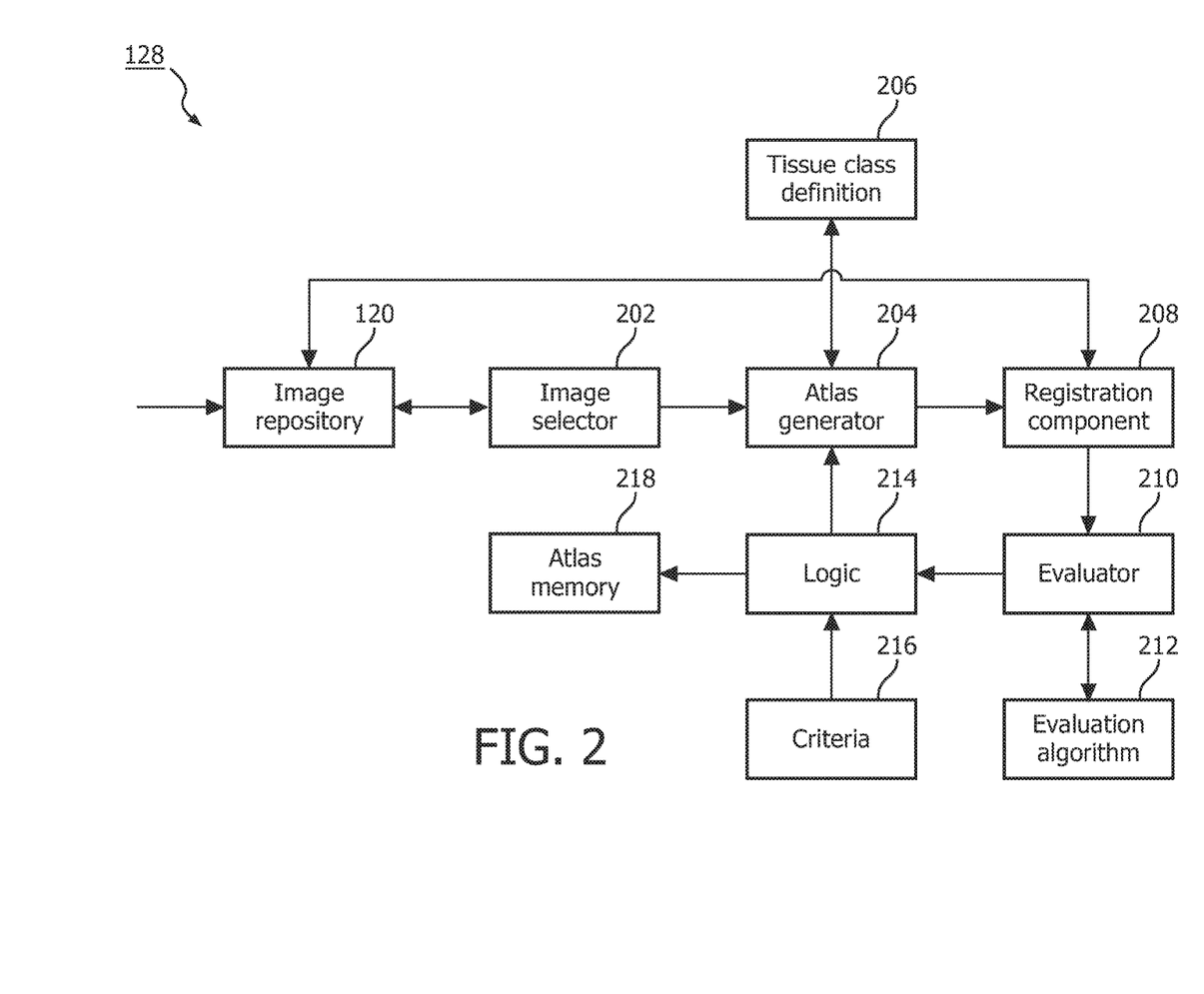
FIG. 2 schematically illustrates an example of the unsupervised training for an atlas-based registration module.

FIG. 2 schematically illustrates an example of the unsupervised training for an atlas-based registration module 128.

The unsupervised training for atlas-based registration module 128 includes an image selector 202, which selects an image from the image repository 120. In one instance, the image selector 202 arbitrarily selects an image from a set of training images. In another instance, the image selector 202 selects an image that includes predetermined anatomical tissue such as an organ of interest. In another instance, the image selector 202 selects an image that includes a greatest number of a set of predetermined anatomical sub-regions of interest (e.g., pelvis, abdomen, thorax, neck, head, etc.). In another instance, the image selector 202 selects an image based on a user preference and/or user input. In yet another instance, the image selector 202 selects an image based on other criteria.

The unsupervised training for an atlas-based registration module 128 further includes an atlas generator 204. The atlas generator 204 generates a tissue class atlas (i.e., a set of tissue atlas images) based on the selected single image and a tissue class definition 206. The tissue class definition 206 can be a default, user defined, and/or other tissue class definition, and is stored in the data 130 of the memory 126 of the computing system 122 of FIG. 1 and/or elsewhere. A non-limiting example of a tissue class definition, with respect to CT, includes a plurality of tissue class ranges from a histogram of CT values in Hounsfield units (HU).

Figure 3:
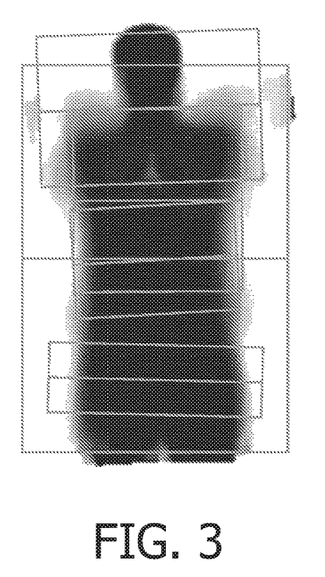
FIG. 3 illustrates an example AIR class atlas image, with example bounding boxes of images used in the training showing different body regions.
Figure 4:
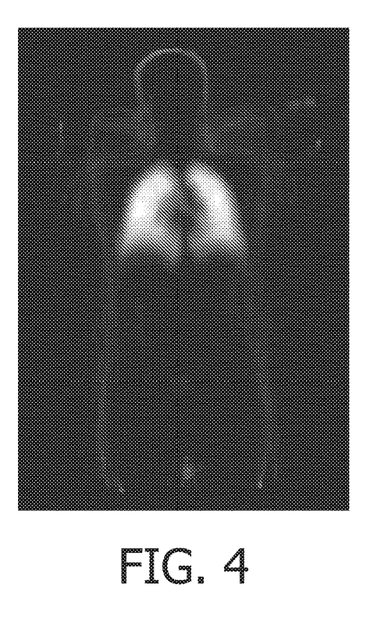
FIG. 4 illustrates an example LUNG class atlas image.
Figure 5:
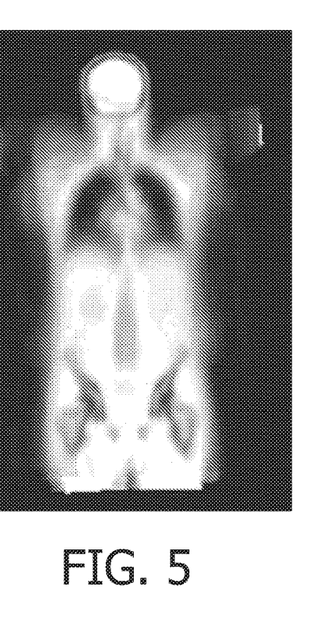
FIG. 5 illustrates an example TISSUE class atlas image.
Figure 6:
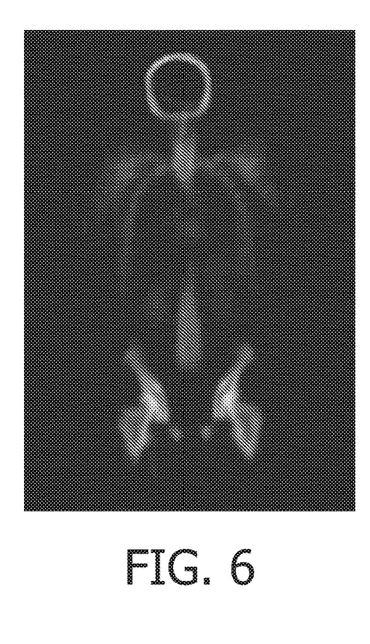
FIG. 6 illustrates an example BONE class atlas image.

For example, one set of non-limiting ranges includes: AIR [−1000, −920], LUNG [−940, −180], TISSUE [−200,250] and BONE [200, 1500]. Other ranges and/or tissue classes are also contemplated herein. FIG. 3 illustrates an example air class atlas, with bounding boxes of training images from different body regions (pelvis, abdomen, thorax, head-neck) are overlaid over the AIR class image. FIG. 4 illustrates an example LUNG class atlas image. FIG. 5 illustrates an example TISSUE class atlas image. FIG. 6 illustrates an example BONE class atlas image. The above example tissue class ranges have only small overlap, such that the probability of an image gray value to belong to a certain tissue class is mostly zero (0) or one (1). In the overlap regions, probabilities can be linearly and/or otherwise interpolated. However, the tissue classes may be also some kind of feature response, like a response to Haar-features, and do not have to be linked to clinically distinguished tissue types, i.e. do not have to be a tissue in the original sense of the word.

The tissue class atlas represents the probability $q(x|t)$ of each image voxel x belonging to each tissue class t. This probabilistic atlas represents the variety of properties given in the image pool. For instance, the area between abdomen and thorax will contain LUNG voxels in an inhale image and TISSUE voxels in an exhale image. The probabilistic atlas has a positive probability for both tissue classes and is thus able to represent two mutually exclusive images simultaneously. More specifically, the probabilistic atlas is a predictor of the image pool, and not of an individual image instance.

The unsupervised training for an atlas-based registration module 128 further includes a registration component 208. The registration component 208 employs a registration approach linked to the atlas and the evaluator 210. A non-limiting example of such a registration method is a probabilistic approach to register one or more of the remaining images in the image repository 120 with the tissue class atlas. In one non-limiting instance, for the registration, each image with domain $\Omega_p$ is decomposed into the different tissue classes. Then, an entropy criterion is evaluated between the probability density function (pdf) of the image $p(x|t)$ and the probability density function (pdf) of the atlas $q(x|t,f)$, transformed with the transformation f, summing over all tissue classes t, as shown in EQUATION 1:

$$-\sum_t \int_{x \in \Omega_p} p(x|t) \log q(x|t, f) \quad \text{EQUATION 1}$$

where the transformation model for f is the similarity, i.e. rotation, uniform scaling and translation. The transformation parameters can be optimized for instance with a controlled random search.

A derivation of EQUATION 1 is described in Vik et al., "A new method for robust organ positioning in CT images," In: 9th IEEE International Symposium on Biomedical Imaging, pp. 338-341 (2012). This derivation, in part, is described next. For the derivation, $u \in R$ is the image gray value, $f = f_\theta$: $R^3 \rightarrow R^3$ is a spatial transformation parameterized by $\theta \in \Theta \subset R^D$ (For the similarity transform, D=7 (translation, rotation, and isotropic scaling)), $P,Q: T \rightarrow [0, 1]$ designates a probability of tissue class, $t \in T$ (P relates to the image, Q to the atlas), and p, q: $x \in \Omega \subset R^3 \rightarrow [0,\infty]$ is the pdf of the continuous spatial variable x (p relates to the image, q to the atlas).

Let $P(t|u)$ be the probability of a tissue class in CT (e.g. T={AIR, TISSUE, LUNG, BONE}) given a gray value u. For a given image, the gray value at a fixed position x is known, so that $P(t|u)$ can be used to determine $P(t|x)$. From Bayes formula, $$p(x|t) = \frac{P(t|x)p(x)}{P(t)} \propto P(t|x),$$

it can be derived that $P(t|x)$ is proportional to $p(x|t)$, if samples (x, t) are drawn with a spatially uniform distribution $p(x)$. This is the case when the image is uniformly sampled, thus we can in fact compute $P(t|x)$ to estimate $p(x|t)$ as used in the EQUATION 1. The same approximation can be made for $q(x|t)$ in all EQUATIONS, where it occurs. There is a strong dependency between spatial location x, and the tissue class t.

Determining the unknown transformation, $f_\theta$, by comparing the pdf of the image, $p(x|t)$, with the pdf of the transformed atlas, $q(x|t,f)$, renders EQUATION 1.

This deforms the atlas q such that tissue positions in the image p are well predicted. This approach has the advantage to be robust to varying image information such as varying field-of-view, and varying relative tissue content: due to the singularity of the log function, EQUATION 1 has the following property: if $p(x|t)>0$ then $\theta$ is chosen such that $q(x|t,f)>0$ as well. Therefore, in one instance, the atlas covers a field-of-view larger than any image. When both pdfs p and q are normalized over the same domain, EQUATION 1 is a cross-entropy. This is only the case when the same anatomy is covered in the image and the atlas, e.g., whole body or same field-of-view.

In one instance, an efficient approximation is made to EQUATION 1, using random sampling. The approximation may be based on Monte Carlo and/or other sampling and results from rewriting the terms of EQUATION 1 as expectations, rendering EQUATION 2:

$$E_{p(x|t)[\log q(x|t,f)]} \approx \sum_{i=1}^{n_t} \log q(x_i|t, f) \quad \text{EQUATION 2}$$

where $n_t$ is a number of sample points, and each $x_i$ is drawn from $p(x|t)$. The sampling can be done based on the image pdf, where probabilities are mostly 0 or 1, and is then compared to the transformed atlas for explanation. The sample points are transformed to the atlas domain with $f^{-1}$. Then the evaluation of $\Sigma \log q(f^{-1}x_i|t)$ is fast. The singularity of the logarithmic function penalizes any matching, where an image sample point cannot be explained by the atlas.

In one instance, the number of sample points $n_t$ per tissue class t in EQUATION 2 is dynamically determined. For example, the number of sample points $n_t$ can be chosen based on the ratio between tissue class occurrence in the atlas and in the image to be registered. In this way, the importance of the tissue classes adapts to the imaged anatomical region, e.g. in a pelvic image, only few LUNG sample points will be chosen, whereas for a thorax image, many LUNG sample points are essential to provide a good match.

The unsupervised training for an atlas-based registration module 128 further includes an evaluator 210. The evaluator 210 evaluates the registration of each image based on an evaluation algorithm 212. In this example, the evaluation algorithm 212 determines a quality of a registration based on a weighted mean cross-correlation of the tissue class image. An example of such an algorithm is shown in EQUATION 3:

$$\frac{1}{\sum_t n_t} \sum_t n_t \frac{\int_{x \in \Omega_p \cap f(\Omega_q)} (p(x|t) - \overline{p})(q(x|t, f) - \overline{q})}{\sqrt{\int_{x \in \Omega_p \cap f(\Omega_q)} (p(x|t) - \overline{p})^2 \cdot \int_{x \in \Omega_p \cap f(\Omega_p)} (q(x|t, f) - \overline{q})^2}}, \quad \text{EQUATION 3}$$

weighted with the number of sample points $n_t$ per tissue class t used for matching, where $f(\Omega_q)$ denotes the registered atlas domain $(\Omega_q)$, and $\overline{p}$ and $\overline{q}$ denote the mean values of $p(x|t)$ and $q(x|t, f)$ over the integration domain $(\Omega_p \cap f((\Omega_q))$.

The unsupervised training for an atlas-based registration module 128 further includes logic 214. The logic 214 compares the weighted mean cross-correlation with predetermined criteria 216. For example, in one instance, the predetermined criteria 216 is in a range from 0.20 to 0.60, such as 0.35, 0.40, 0.55, etc. If the cross-correlation is above predetermined criteria 216, then the registration is classified as successful. Otherwise, the registration is classified as not successful. All successfully registered images are used by the atlas generator 204 to build a subsequent tissue class atlas.

In general, this process of mapping all training images onto the current tissue class atlas and constructing a next atlas out of all successfully matched training images is iterated, until, for example, no additional training images are successfully registered, based on the evaluation criteria 212, maximal number or iterations is reached, and/or other stopping criterion is satisfied. Having the image selector 202 select an initial training image that covers a large field-of-view may simplify the training process. Where the initial image is smaller than the final atlas domain, the field-of-view may grow with each iteration automatically as more and more images sticking out of the current atlas domain are successfully registered.

Atlas memory 218 stores the final tissue class atlas. The final tissue atlas can simultaneously represent mutually exclusive anatomical variations (arms up/down, bladder full/empty, inhale/exhale). The training is performed unsupervised in that it requires no user input, and the atlas extends itself to cover all anatomies present in the training images. Organ localization can be achieved with not-so-accurate and very sparse ground truth. Moreover, as the localization process is based on an atlas-based registration, the user can define new structures or bounding boxes in the atlas domain and use the method to detect these in images. For this, the user can draw a bounding box for a region-of-interest in the atlas or in one of the training images. Then, this bounding box is transferred into each of the training images to estimate the location of the structure-of-interest.

Thus, the approach described herein is not only adequate for structure initialization and field-of-view detection, but for very broad data analysis and big data approaches. This enables semantic navigation in a dataset, e.g. the automatic view generation for several organs in a clinical workflow. To generalize the approach, a more complex transformation space may be explored, e.g. a second, organ specific local registration step. This may be extended with techniques, which detect resections of organs or the patient gender automatically.

Further, with the same unsupervised training method, a local atlas focused on the structure-of-interest can be built. A bounding box of the structure of interest can be defined in the atlas and be used with the registration method to position it in all training images. The bounding boxes in all training images can be registered with the same process as the whole image on one example local atlas, which will be refined iteratively until convergence as well. In this way a local registration which matches only the region-of-interest can be achieved. This can be used for improved organ localization.

In addition to the above, the approached described herein covers unsupervised atlas training applications based on tissue classes of CT images, but use different tissue class definitions or success-rate thresholds, based on a different registration scheme on CT images, as long as it has the two key properties of this invention: dynamic adaption to the properties (especially but not only field-of-view) of an unseen image and automatic detection of success or failure of the match, based on other than CT images and an appropriate registration scheme, as long as it has the two key properties of this invention as described above, and/or other applications.

Figure 7:
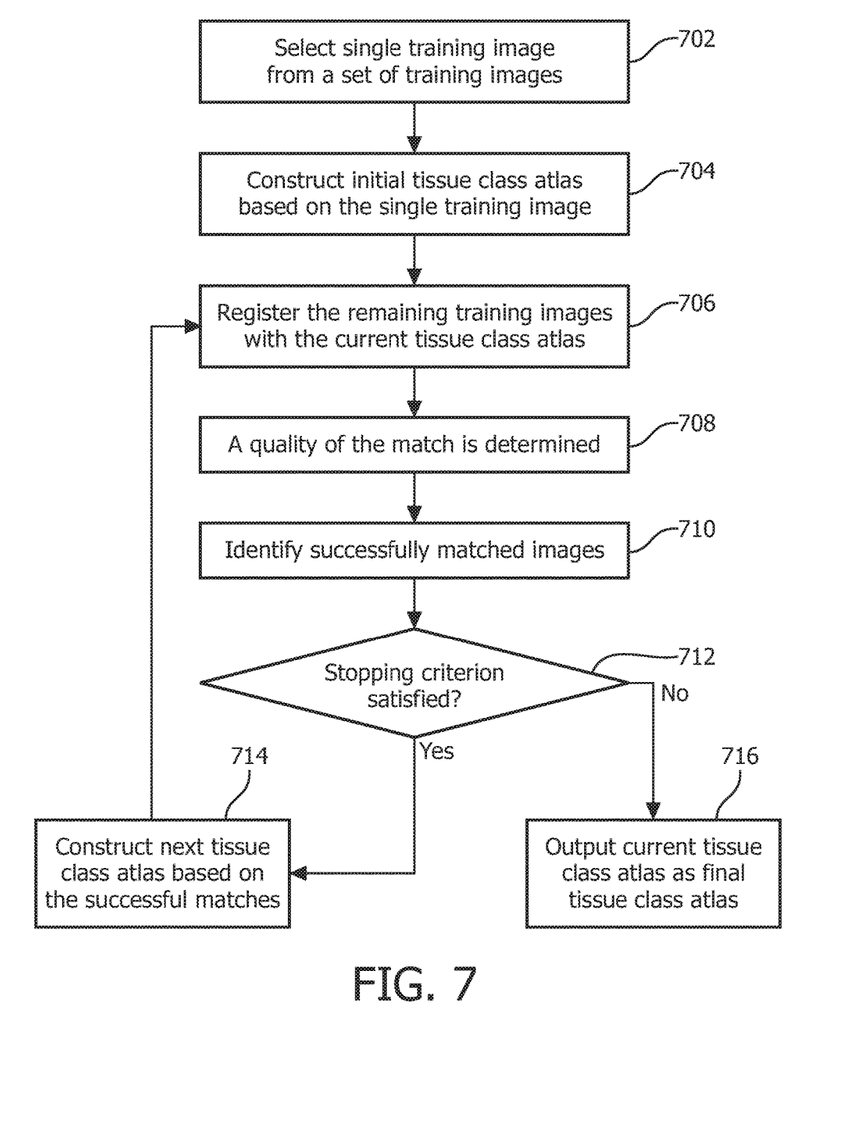
FIG. 7 illustrates an example method in accordance with the disclosure herein.

FIG. 7 illustrates an example method in accordance with the disclosure herein.

It is to be appreciated that the ordering of the acts is not limiting. As such, other orderings are contemplated herein. In addition, one or more acts may be omitted and/or one or more additional acts may be included.

At 702, a single training image, from a set of training images, covering a patch or sub-portion of the body is selected.

At 704, the single training image is used to construct an initial tissue class atlas.

At 706, the remaining training images are registered onto the current tissue class atlas. This can be achieved, for example, as described herein in connection with EQUATIONS 1 or 2.

At 708, a quality metric of the match is determined. As described herein, this can be achieved through a weighted mean cross-correlation of the tissue class images, weighted with the number of sample points $n_t$ per tissue class t used for matching, as described herein in connection with EQUATION 3.

At 710, successfully registered images are identified based on the quality metric. As described herein, this may include comparing the quality metric with a predetermined threshold.

At 712, it is determined if predetermined stopping criterion (e.g., additional training images are successfully registered, a maximal number of iterations, etc.) is met.

If the stopping criterion is not satisfied, then at 714 a next tissue class atlas is generated based on the identified images (i.e., the successful matches), and steps 706 to 712 are repeated. If the stopping criterion is satisfied, then at 716, the current tissue class atlas is output as the final tissue class atlas.

The above may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method, comprising:
   obtaining a single training image from a set of training images in a data repository;
   generating an initial tissue class atlas based on the obtained single training image, wherein the initial tissue class atlas includes two or more different tissue class images corresponding two or more different tissue classes;
   registering the remaining training images of the set of training images to the initial tissue class atlas;
   generating a quality metric for each of the registered images;
   evaluating the quality metric of each of the registered image with a predetermined evaluation criterion;
   identifying a sub-set of images from the set of training images that satisfy the evaluation criterion; and
   generating a subsequent tissue class atlas based on the identified sub-set of the set of training images.

2. The method of claim 1, further comprising:
   registering the remaining training images of the set of training images to the subsequent tissue class atlas;
   generating a quality metric for the registered images;
   evaluating the quality metric of each registered image with the predetermined criterion;
   identifying a second sub-set of the set of training images that satisfy the evaluation criterion; and
   generating a second subsequent initial tissue class atlas based on the identified sub-set of the set of training images.

3. The method of claim 1, further comprising:
   dynamically determining a finite number of sample points in an image for registration of the image with one or more of the initial tissue class atlas, the subsequent tissue class atlas or the second subsequent tissue class atlas; and
   registering the image with the one or more of the initial tissue class atlas, the subsequent tissue class atlas or the or a second subsequent tissue class atlas using the finite number of sample points.

4. The method of claim 3, further comprising:
determining the finite number of sample points based on a ratio between a tissue class occurrence in the one or more of the initial tissue class atlas, the subsequent tissue class atlas or the second subsequent tissue class atlas and a tissue class occurrence in the image to be registered to the one or more of the initial tissue class atlas, the subsequent tissue class atlas or the second subsequent tissue class atlas.

5. The method of claim 4, wherein the finite number of sample points includes a first set of sample points in response to the image including a first level of a tissue class corresponding to the initial tissue class atlas and a second set of sample points in response to the image including a second level of the tissue class, the first level is greater than the second level, and the first set of sample points is larger than the second set of sample points.

6. The method of claim 3, further comprising:
generating the quality metric by calculating a weighted mean cross-correlation of the two or more tissue class images.

7. The method of claim 6, further comprising:
weighting the mean cross-correlation of the two or more tissue class images based on the finite number of sample points.

8. The method of claim 1, further comprising:
generating the quality metric by calculating a weighted mean cross-correlation of the tissue class images.

9. The method of claim 1, further comprising:
registering the remaining training images of the set of training images to the initial tissue class atlas by decomposing the remaining training images into tissue class images, evaluating an entropy criterion between a first probability density function of an image and a second probability density function of the initial tissue class atlas transformed with a predetermined transformation, and summing over all tissue classes.

10. The method of claim 9, further comprising:
approximating integrals of per tissue class with Monte Carlo sampling in image space.

11. The method of claim 1, wherein the initial tissue class atlas is a probabilistic tissue class atlas.

12. The method of claim 1, wherein the single training image has a first field-of-view and the subsequent tissue class atlas has a second field-of-view, and the second field-of-view is larger than the first field-of-view.

13. The method of claim 1, wherein at least two images of the set of training images cover different regions of the human body.

14. The method of claim 1, wherein the two or more different tissue classes are from a group consisting of: air, lung, soft tissue and bone.

15. A computing system, comprising:
a memory that stores instructions of an unsupervised training for an atlas-based registration module; and
a processor that executes the instructions, which causes the processor to train an atlas-based registration based on the instructions of an unsupervised training for an atlas-based registration module, said instructions including iteratively identifying a sub-set of one or more training images in a set of training images,
wherein—the processor, in response to executing the instructions:
obtains a single training image from a set of training images in a data repository;
generates an initial tissue class atlas based on the obtained single training image, wherein the initial tissue class atlas includes two or more different tissue class images corresponding two or more different tissue class types;
registers the remaining training images of the set of training images to the initial tissue class atlas;
generates a quality metric for each of the registered images;
compares the quality metric of each of the registered image with a predetermined threshold;
identifies a sub-set of images from the set of training images that satisfy the predetermined threshold; and
generates a subsequent tissue class atlas based on the identified sub-set of the set of training images.

16. The computing system of claim 15, the processor, in response to executing the instructions:
registers the remaining training images of the set of training images to the subsequent tissue class atlas;
generates a quality metric for the registered images;
comparing the quality metric of each registered image with the predetermined threshold;
identifies a second sub-set of the set of training images that satisfy the predetermined threshold; and
generates a second subsequent tissue class atlas based on the identified sub-set of the set of training images.

17. The computing system of claim 16, the processor, in response to executing the instructions:
dynamically determines a finite number of sample points in an image for registration of the image with the one or more of the initial tissue class atlas, the subsequent tissue class atlas or the second subsequent tissue class atlas based on a ratio between a tissue class occurrence in the one or more of the initial tissue class atlas, the subsequent tissue class atlas or the second subsequent tissue class atlas and a tissue class occurrence in the image to be registered to the one or more of the initial tissue class atlas, the subsequent tissue class atlas or the second subsequent tissue class atlas; and
registers the image with the one or more of the initial tissue class atlas, the subsequent tissue class atlas or the or a second subsequent tissue class atlas using the finite number of sample points.

18. The computing system of claim 17, the processor, in response to executing the instructions:
generates the quality metric by calculating a weighted mean cross-correlation of the two or more tissue class images; and
weights the mean cross-correlation of the two or more tissue class images based on the finite number of sample points.

* * * * *